UNITED STATES PATENT OFFICE.

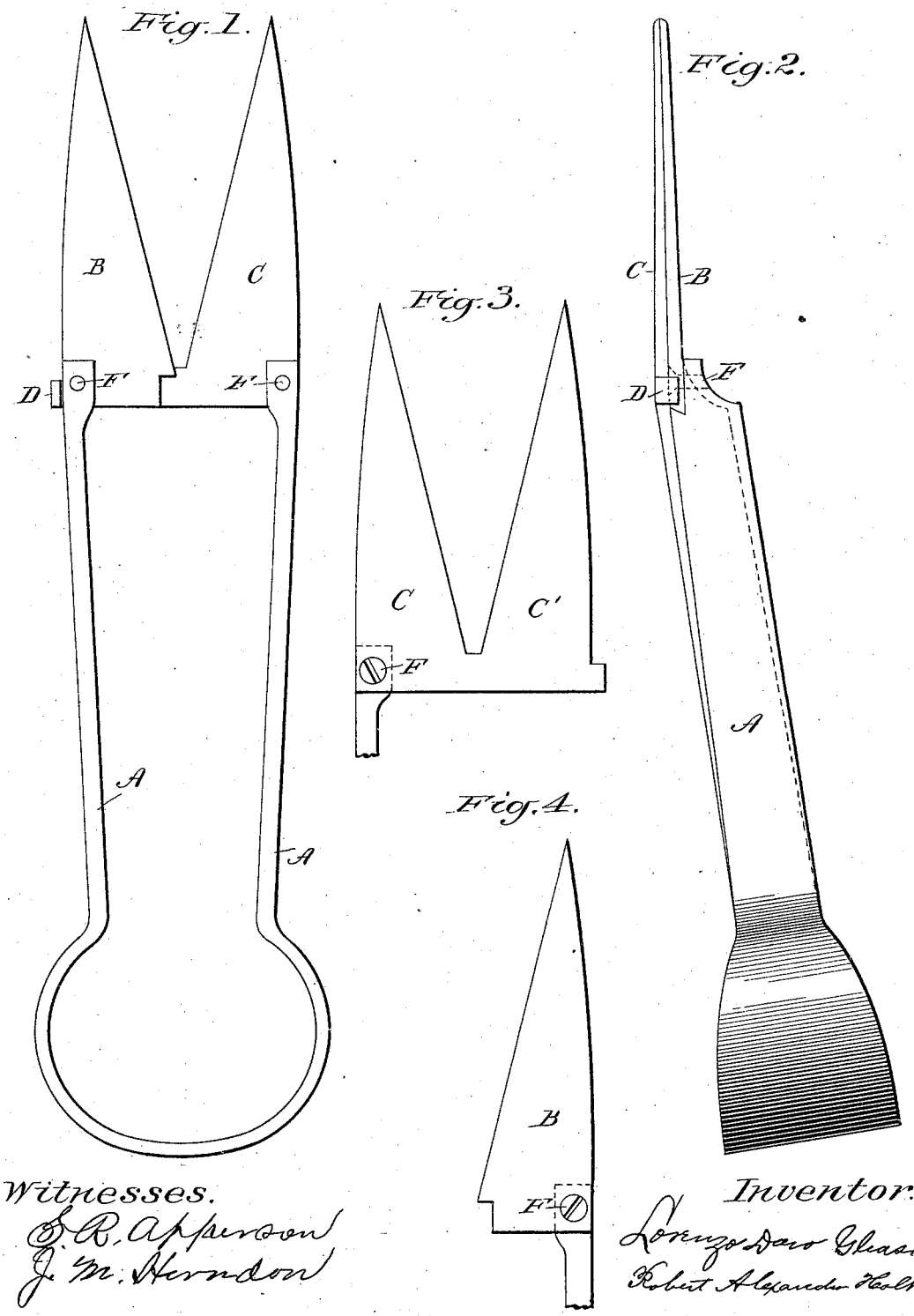

LORENZO D. GLEASON AND ROBERT A. HOLT, OF LEBANON, MISSOURI.

ANIMAL-SHEARS.

SPECIFICATION forming part of Letters Patent No. 287,018, dated October 23, 1883.

Application filed April 30, 1883. (Model.)

*To all whom it may concern:*

Be it known that we, LORENZO DOW GLEASON and ROBERT ALEXANDER HOLT, citizens of the United States, residing at Lebanon, in the county of Laclede and State of Missouri, have invented certain new and useful Improvements in Sheep-Shears; and we do hereby declare that the following is a full, clear, and exact description of the invention, which will enable others to use the same.

Our invention relates to shears for shearing sheep; and the object is to provide a pair of shears which shall be adapted to hold the skin of the animal in a stretched or smooth condition during the action of shearing, to prevent the skin from puckering up between the blades and being cut.

In the accompanying drawings, Figure 1 is a top view of the improved shears. Fig. 2 is a side view of the same; and Figs. 3 and 4 are partial views, showing the under sides of the blades.

A indicates the spring-handle of the shears, and B and C are the cutting-blades, formed in distinct pieces, and secured to the ends of the bent handle by screws F.

We prevent the cutting of the skin of the sheep during the process of shearing by means of the protecting blade or guard C', which is attached to the cutting-blade C by being manufactured as a part of it. The lower surface of the protecting-blade C' is on the same plane as the lower surface of cutting-blade C, and the top surface of the protecting-blade C' is on the same plane as the upper surface of the cutting-blade C. The lower surface of the cutting-blade B is on the same plane as the upper surfaces of the blades C' and C. The left-hand edge of blade C is beveled from the bottom to the top surface and the right-hand edge of blade B is beveled from the top to the bottom surface, making the cutting-surfaces on a level with the plane of the top surface of the blade C. The pressure of the hand being applied to the handles, the cutting-blade B passes along to the right, pressing on the upper surface of cutting-blade C, thus severing the wool. In shearing, the protecting-blade C' and cutting-blade C remain stationary, and blade B, passing along on top, severs the wool, and thus there is no chance for the skin to come in contact with the cutting-surfaces of the blades. The blades rest on a shoulder in the lower ends of the handles, and are fastened to the handles with screws which pass through the blades and into the handle, as represented by F in the accompanying drawings. If the blades be broken or worn out, new ones can be substituted without the expense of a new handle. The stop D, formed on the guard C', is used to hold the cutting-blade B in proper position when the shears are open.

We do not broadly claim a guard for a pair of sheep-shears, various forms of such a device having been used heretofore.

Having fully described our invention, what we desire to claim, and to secure by Letters Patent, is—

The combination of the spring-handle A, the cutting-blades B and C, secured to the ends of said handle and having movement independent of each other, and the guard C', formed in one piece with one of the blades and arranged in the same plane therewith, and having a stop, D, formed upon it to limit the spreading of the other blade, substantially as shown and described.

LORENZO DOW GLEASON.
ROBERT ALEXANDER HOLT.

Witnesses:
J. M. HERNDON,
S. R. APPERSON.